Nov. 1, 1927.
O. J. SCHULD
CORN SNAPPING ROLLER
Filed Sept. 1, 1927
1,647,936
2 Sheets-Sheet 1
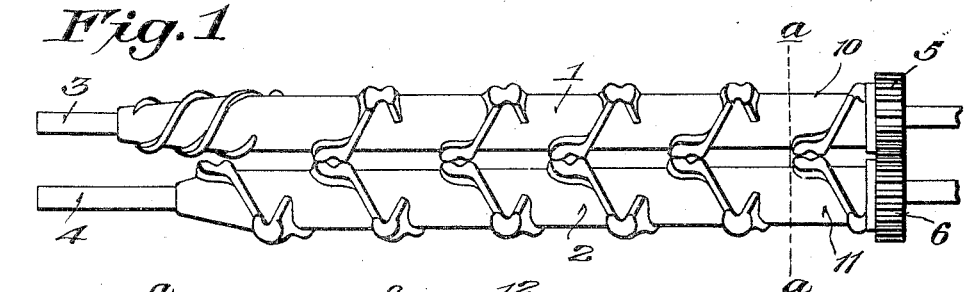
Fig.1
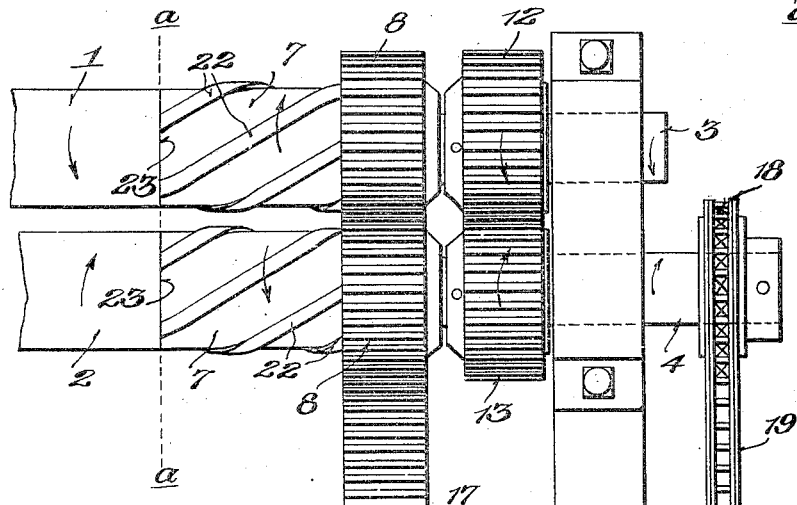
Fig.2.
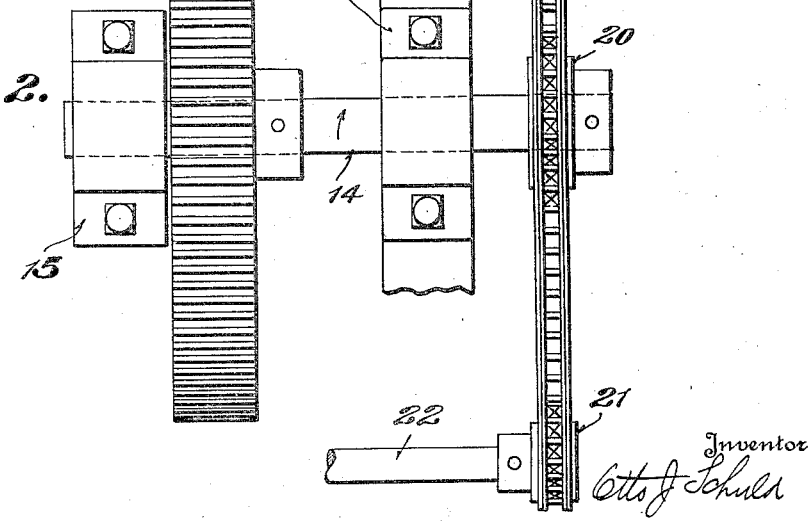
Inventor
Otto J. Schuld
By A. W. Freeman.
Attorney Nov. 1, 1927.

O. J. SCHULD

CORN SNAPPING ROLLER

Filed Sept. 1, 1927

Patented Nov. 1, 1927.

1,647,936

UNITED STATES PATENT OFFICE.

OTTO J. SCHULD, OF MADISON, SOUTH DAKOTA.

CORN-SNAPPING ROLLER.

Application filed September 1, 1927. Serial No. 216,961.

This invention relates to certain new and useful improvements in corn snapping rollers, and the primary object of the invention is to provide an improved structure of rollers and more particularly a structure which can be applied to machines now in use, which structure overcomes the present day objection of small nubbin ears jamming in the high or feed end of the rollers with resultant clogging thereof.

A further object of the invention is to provide a roller structure which overcomes the objection of injury to the fingers or hands of the operator when the latter attempts to extricate the ear or stalk upon jamming thereof and to further provide a structure wherein the ears or stalks will be thrown up and into the conveyor as same engage with the high ends of the rollers.

In the drawings:—

Fig. 1 is a top plan view of corn snapping rollers as in general use;

Fig. 2 is a top plan view of the present invention showing same applied to the rollers of Fig. 1, after cutting along the line a—a;

Figure 3:
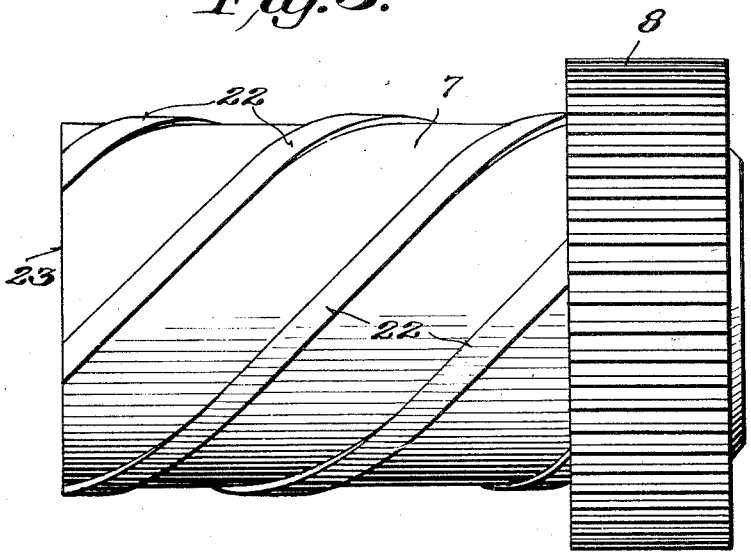
Fig. 3 is a detail side elevation of the attachment per se.
Figure 4:
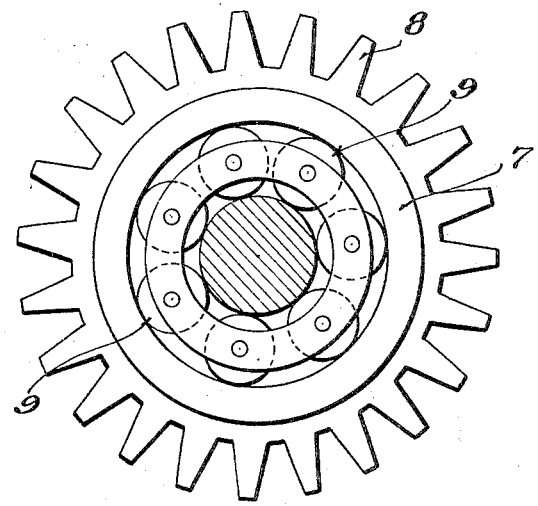
Fig. 4 is an end elevation of Fig. 3.

As shown in Fig. 1 of the drawings, the rollers 1 and 2 are mounted on shafts 3 and 4 and are driven by means of intermeshing gears 5 and 6. The present invention consists of sleeves 7 to one end of which are secured gears 8. The sleeves are preferably provided with roller bearings 9 as shown in Fig. 4. The present invention proposes a roller structure which can be applied to machines now in general use or which can be built into machines during manufacture thereof. In the former instance the rollers 1 and 2 are cut along the line a—a indicated in Fig. 1 and the cut portions 10 and 11 with the gears 5 and 6 thereof are removed. The sleeves 7 are then slid onto the shafts 3 and 4 and with their gears 8 intermeshing as shown in Fig. 2. Intermeshing gears 12 and 13 are keyed to the shafts 3 and 4 so as to drive the shafts in unison and toward one another as is customary in the art. In order to drive the rollers 8 a shaft 14 is provided and which is mounted in bearing blocks 15 and 16 that are bolted to the machine. A gear 17 is keyed on the shaft 14 and meshes with one of the gears 8 thereby to drive the latter in unison. The shaft 4 has a sprocket 18 thereon driven by a chain 19 from a sprocket 27 on the usual pick-up shaft 22. A sprocket 20 on the shaft 14 is also driven by the sprocket chain 19.

By referring to Fig. 2 of the drawings, it will be seen that the rollers 1 and 2 are driven in unison toward each other while the sleeves 7 and 8, which latter are preferably provided with spiral-like ribs 22, are driven in opposite directions away from each other. The ends 23 of the sleeves have a close fit with the cut ends a—a of the rollers 1 and 2, so that material cannot collect in the joints.

From the foregoing, it will be noted that since the sleeves 7—7 are operated in a reverse direction to the rollers 1 and 2 and are rotated in opposed directions away from each other at the high sides of the sleeves, the fingers of the operator cannot be caught between the sleeves 7—7 and there is no possibility of the ears or stalks being clogged or jammed between the sleeves.

It will also be noted that since the sleeves rotate away from each other, they will throw any husks that may engage same upwardly, thereby overcoming jamming.

What is claimed is:—

1. In a corn snapper, a pair of shafts, snapping rollers on the shafts having feed ends and discharge ends, sleeves on the shafts having projections thereon, intermeshing gears carried by the sleeves, said sleeves being engaged with the discharge ends of the rollers, means to rotate one of the gears so as to effect opposite rotation of the sleeves away from each other at the upper arcs of the sleeves, and means to rotate the shafts and thereby the rollers in opposite directions and towards each other at the upper arcs of the rollers.

2. In a corn snapper, a pair of shafts, snapping rollers on the shafts having feed ends and discharge ends, sleeves on the shafts having projections thereon, said sleeves being engaged with the discharge ends of the rollers, means to rotate the sleeves away from each other at the upper arcs thereof, and means to rotate the shafts and thereby the rollers towards each other at the upper arcs of the rollers.

3. In a corn snapper, a pair of snapping rollers having feed ends and discharge ends, means to rotate the rollers towards each other at the upper arcs thereof, a pair of sleeves adjacent the discharge ends of the rollers, and means to rotate the sleeves in directions opposite to the respective directions of rotation of the rollers.

4. In a corn snapper, a pair of snapping rollers having feed ends and discharge ends, means to rotate the rollers towards each other at the upper arcs thereof, husk engaging means at the discharge ends of the rollers, and means to rotate the husk engaging means away from each other at the upper portions thereof.

5. In a corn husker, corn snapping means including rollers rotatable towards each other at their upper arcs, said rollers having feed ends and discharge ends, means at the discharge ends of the rollers to engage the husks, and means to operate the last-named means so as to move the husks in a direction outwardly and away from the rollers.

6. An attachment for the snapping rollers of a corn husker, including a pair of shafts, snapping rollers having feed ends and discharge ends on the shafts, sleeves on the shafts having their ends contacting with the discharge ends and forming a continuation of said rollers, means to rotate the rollers toward each other at their upper arcs, and means to rotate the sleeves away from each other at their upper arcs.

In testimony whereof I affix my signature.

OTTO J. SCHULD.